(12) United States Patent
Feeser et al.

(10) Patent No.: US 7,966,665 B1
(45) Date of Patent: Jun. 21, 2011

(54) COMPLIANCE VALIDATOR FOR RESTRICTED NETWORK ACCESS CONTROL

(75) Inventors: Colin Lee Feeser, Atlanta, GA (US); Anthony William Ondrus, Kennesaw, GA (US); Mark Jackson Canup, Atlanta, GA (US)

(73) Assignee: Open Invention Network, LLC

( * ) Notice: Subject to any disclaimer, the term of this patent is extended or adjusted under 35 U.S.C. 154(b) by 885 days.

(21) Appl. No.: 11/941,546

(22) Filed: Nov. 16, 2007

(51) Int. Cl.
| | |
|---|---|
| G06F 7/04 | (2006.01) |
| G06F 17/30 | (2006.01) |
| H04N 7/16 | (2006.01) |
| G06F 17/00 | (2006.01) |
| H04L 29/06 | (2006.01) |
| G06F 15/16 | (2006.01) |

(52) U.S. Cl. ............ 726/30; 726/1; 726/5; 726/6; 726/7; 726/21

(58) Field of Classification Search .................. None
See application file for complete search history.

(56) References Cited

U.S. PATENT DOCUMENTS

| | | | |
|---|---|---|---|
| 6,366,913 B1 | 4/2002 | Fitler, Jr. et al. | |
| 6,466,932 B1 | 10/2002 | Dennis et al. | |
| 6,470,453 B1 | 10/2002 | Vilhuber | |
| 6,633,872 B2 | 10/2003 | Ambrosini et al. | |
| 6,941,465 B1 | 9/2005 | Palekar et al. | |
| 7,100,195 B1 | 8/2006 | Underwood | |
| 7,181,436 B1 | 2/2007 | Conley et al. | |
| 7,506,102 B2 * | 3/2009 | Lev-Ran et al. | 711/118 |
| 7,853,687 B2 * | 12/2010 | Le Moigne et al. | 709/224 |
| 2002/0120685 A1 | 8/2002 | Srivastava et al. | |
| 2002/0147801 A1 | 10/2002 | Gullotta et al. | |
| 2002/0178249 A1 | 11/2002 | Prabakaran et al. | |
| 2003/0154404 A1 | 8/2003 | Beadles et al. | |
| 2004/0167984 A1 | 8/2004 | Herrmann | |
| 2004/0204949 A1 | 10/2004 | Shaji et al. | |
| 2004/0215751 A1 | 10/2004 | Kumar et al. | |
| 2005/0075115 A1 | 4/2005 | Corneille et al. | |
| 2005/0138110 A1 | 6/2005 | Redlich et al. | |
| 2005/0257245 A1 | 11/2005 | Patrick et al. | |

(Continued)

OTHER PUBLICATIONS

Windows IT PRO, "Guard Your Network with Software NAC", http://www.windowsitpro.com/articles/print.cfm?articleid=95842; (2007).

(Continued)

Primary Examiner — Shin-Hon Chen
(74) Attorney, Agent, or Firm — Williams Mullen

(57) ABSTRACT

A method, system, and computer program product for detecting and enforcing compliance with access requirements for a computer system in a restricted computer network. A compliance validation configuration file is created for the computer system. A maintenance service utility is configured to launch a compliance validation executable file at a specified time during operation of the computer system. A digital hash is generated for the compliance validation executable file and for the compliance validation configuration file. A determination is made if the computer system or a computer system user is a member of a configured restricted group. If the computer system or the computer system user is a member of a configured restricted group, a determination is made if a directory site code for a subnet of the restricted computer network to which the computer system is connected corresponds to a configured and allowed site. If the directory site code does not correspond to a configured and allowed site, compliance with access requirements are enforced. Enforcement actions can include a forced logoff of the computer system user, and/or a forced shutdown of the computer system.

15 Claims, 5 Drawing Sheets

U.S. PATENT DOCUMENTS

| | | | |
|---|---|---|---|
| 2006/0236370 | A1 | 10/2006 | John et al. |
| 2007/0056018 | A1 | 3/2007 | Ridlon et al. |
| 2007/0124803 | A1* | 5/2007 | Taraz ................................ 726/4 |
| 2007/0143851 | A1* | 6/2007 | Nicodemus et al. ............ 726/25 |
| 2007/0156694 | A1* | 7/2007 | Lim .................................. 707/9 |
| 2007/0203999 | A1* | 8/2007 | Townsley et al. ............. 709/207 |
| 2007/0211722 | A1* | 9/2007 | Subramanian ................ 370/390 |

OTHER PUBLICATIONS

Quest Software, "Quest ActiveRoles Server", pp. 22-28 (total pp. 1-49), http://isdp.cit.nih.gov/openaccess/admmmc/ActiveRolesServer_5.2_Overview.pdf.

* cited by examiner

COMPLIANCE VALIDATOR FOR RESTRICTED NETWORK ACCESS CONTROL

BACKGROUND OF THE INVENTION

The present invention relates generally to information processing on a computer network and, more particularly, to methods and systems for detecting and enforcing compliance with restricted subnet access requirements in a corporate wide area network.

In computer network communications, geographic and other limitations result in a need to create smaller networks called subnets to facilitate communications between locations. In a network containing many Microsoft Windows computing platforms, Active Directory is a network-based object store and directory service that locates and manages resources, and makes resources available to authorized users and groups. Each object has certain attributes and its own security access control list (ACL). Active Directory catalogs file objects with their attributes in a hierarchical arrangement and utilizes naming resolution services such as the Domain Name System (DNS). Active Directory has an important role in identifying security policies across the network.

The physical network structure of Active Directory is based on a unit known as a site. A site includes one or more Internet Protocol (IP) subnets. Many subnets can belong to a single site, but a single subnet cannot span multiple sites. A site can have multiple domains, and a domain can have a number of sites. Sites and domains do not need to maintain the same namespace. On Windows Server systems, a domain controller is the server that responds to security authentication requests within the Windows Server domain. A domain controller contains a copy of the Active Directory. All domain controllers are peers and maintain replicated versions of Active Directory for their domains.

A large enterprise will typically have a wide area network (WAN) with many thousands of workstations that are connected to various servers in the network. To protect data within departments, restrictions will need to be in place to secure and manage sometimes critical information. For example, in the electrical power industry, under certain Federal guidelines it is important to restrict the access of certain parts of an electrical power company from communicating with other parts of the same company. This restricted access also includes being able to bring a computer up on certain segments of the network identified as subnets. Thus, there is a need for a system that provides the ability to discover and control subnet compliance breaches as mandated by new Federal Regulatory Commission (FERC) requirements for gas and electric utilities which prohibit communications between specific parts of the utilities. There is also a need for a system that can audit restricted subnet access.

SUMMARY OF THE INVENTION

The present invention is directed to a utility for detecting and enforcing compliance where users and/or machines of a particular Active Directory group are restricted from accessing particular subnets of a corporate wide area network based upon Active Directory Site Codes. Concerning the restricted subnets/site codes, the compliance validator utility displays a message to the user when it determines that the machine is on a restricted network. It can also be armed in such a way that, under this scenario, it can be configured to log the user off or even shut the machine down. Alternatively, the compliance validator utility can check for the use of a restricted website as a home page and change the home page to a website that is permitted. The compliance validator utility can also be configured to add or remove registry keys. The utility is designed to be self-updating and centrally configured. All activity is logged to a Windows EventLog. When a compliance violation is detected, a log file is sent to a central location. The compliance validator utility is designed to run from a log-in script and/or a service such as the Windows maintenance server utility or the Task Scheduler application available from Microsoft Corporation.

The compliance validator utility determines if the machine and the user are members of configured restricted groups. If either is true, the utility will perform the following tasks: (1) set and/or remove configured registry keys; (2) check the active directory site code of the IP subnet of the network to which the machine is connected; (3) if the active directory site code is not one of the configured allowed AD sites, display a message and optionally perform the enforcement measure of logging the user off or shutting down the machine; and (4) if a compliance violation takes place, generate a log in the Windows Event Log and send the log to a configured central logging location. The capabilities of the compliance validator utility include the ability to detect tampering such as removing or altering the configuration file. In this instance, the utility will display a message and potentially perform enforcement measures such as logging the user off before shutting down the machine. Executable and configuration files for compliance validator are digitally hashed. The utility will detect a change in the central file for either the executable or configuration file and automatically update the affected file. The paths to the central update location are encrypted to prevent tampering. If a non-restricted machine is logged onto by a restricted user, the compliance validator utility will be installed on the machine. As an option, when a non-restricted user logs onto the machine, the compliance validator utility can be configured to automatically uninstall itself.

In one aspect of the invention, a method, system, and computer program product are provided for detecting and enforcing compliance with access requirements for a computer system in a restricted computer network. The method begins with the step of creating a compliance validation configuration file for the computer system. A maintenance service utility is configured to launch a compliance validation executable file at a specified time during operation of the computer system. The method generates a digital hash for the compliance validation executable file and for the compliance validation configuration file. The method then determines if the computer system or a computer system user is a member of a configured restricted group. If the computer system or the computer system user is a member of a configured restricted group, the method determines if a directory site code for a subnet of the restricted computer network to which the computer system is connected corresponds to a configured and allowed site. If the directory site code does not correspond to a configured and allowed site, the method enforces compliance with access requirements. Enforcement actions can include a forced logoff of the computer system user, and/or a forced shutdown of the computer system.

The system includes a plurality of components that perform the steps of the method when operated on a computer system. The computer program product includes a computer readable medium having computer instructions embedded therein, the computer readable medium implementing the method when operated on the computer system

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

Figure 1A:
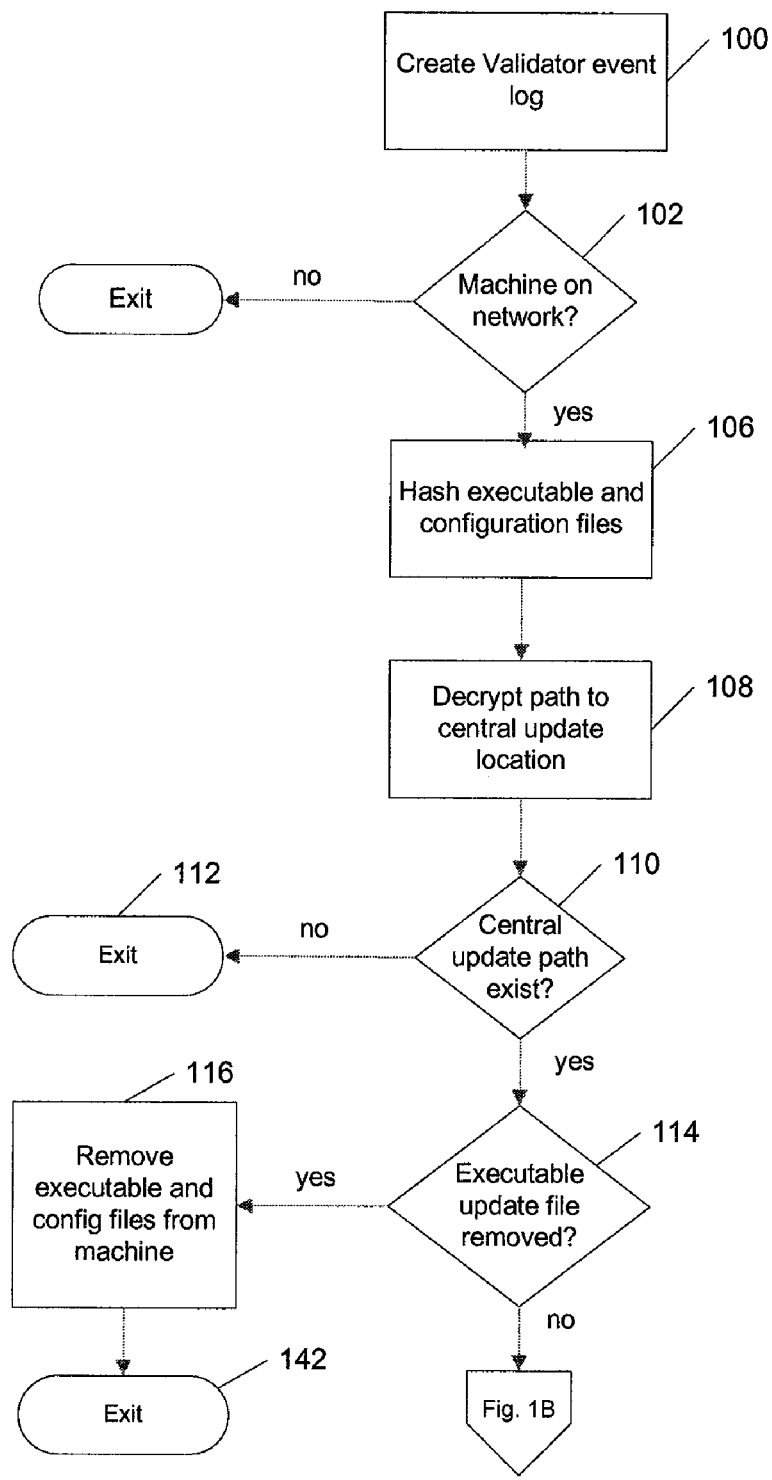
FIGS. 1A-1B illustrate the processing logic for the compliance validator utility in accordance with an exemplary embodiment of the invention.

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Compliance validator is a utility for detecting and enforcing compliance where users and/or machines of a particular Active Directory group are restricted from accessing particular subnets of a corporate wide area network based upon Active Directory Site Codes. Concerning the restricted subnets/site codes, compliance validator will display a message to the user when it determines that the machine is on a restricted network. It can also be armed in such a way that under this scenario it can be configured to log the user off or even shut the machine down.

Alternatively, the compliance validator utility can also check for the use of a restricted website as a home page and change the home page to a website that is allowed. Compliance validator can also be configured to add or remove registry keys. As is well known, in a Microsoft Windows environment, the registry contains information that Windows references during operation, such as user profiles, installed applications, and the types of document that each can create, system hardware information, and ports that are being used. The registry is divided into a number of logical sections called "hives." A registry hive is a group of keys, subkeys, and values in the registry that has a set of supporting files containing data backups. Certain predefined keys are used by Windows systems. They begin with the term "HKEY" which is an abbreviation for hive key. The registry hives that are used by the present invention include: (1) HKEY_LOCAL MACHINE (HKLM), (2) HKEY_CURRENT_USER (HKCU), (3) HKEY_CLASSES_ROOT (HKCR), (4) HKEY_CURRENT_CONFIG (HKCC), and (5) HKEY_USERS (HKU). The HKLM hive key contains configuration information particular to the computer for any user. The HKCU hive key contains the root of the configuration information for the user currently logged on to a particular computer. This is a subkey of HKU. The HKCR hive key is a subkey of HKLM and provides a view of the registry that merges information from the HKCU and HLKM keys. The HKCC hive key contains information about the hardware profile that is used by the local computer at system startup. The HKU hive key contains all the actively loaded user profiles on the computer.

The compliance validator utility is designed to be self updating and centrally configured. The compliance validator utility logs all activity to the Windows EventLog. When a compliance violation is detected a log file is sent to the central location. The compliance validator tool is designed to run from a login script and/or a service such as a Windows Maintenance Service utility or a Task Scheduler utility.

In the event of an emergency, the compliance validator utility can be easily disarmed, reconfigured or even removed from all machines. If the compliance validator utility is installed on a non-restricted machine through an event such as a restricted user logging on, it can optionally uninstall itself when logged on by a non-restricted user.

In one embodiment, the compliance validator utility performs in the following manner. Compliance validator will only run in one iteration. If another iteration is in memory, it will exit. If one doesn't exist, compliance validator will establish a Windows EventLog folder named "Validator Log." All activity of compliance validator will be logged to this folder which can be reached remotely. Compliance validator will determine if the machine is on a network. If compliance validator determine that the machine is not on a network it will exit. Compliance validator can detect tampering such as removing or altering the configuration file, and will display a message and potentially perform enforcement measures such as logging the user off, or shutting down the machine. Executable and configuration files are digitally hashed. Compliance validator will detect a change in a central file for either the executable or configurable file and automatically update the affected file. The paths to the central update location are encrypted to prevent tampering. If the central update path exists, but the executable update file has been removed, compliance validator will automatically remove itself and the configuration file from the machine.

The registry settings under [RegistryDeletes] will be removed regardless of the value in PerformRegDels. If the central update path exists, but the configuration file has been removed, compliance validator will simply exit. Compliance validator checks to see if the machine and the user are members of configured restricted groups. If either is true, compliance validator will set and/or remove configured registry keys, and check the Active Directory (AD) Site Code of the IP Subnet of the network to which the machine is connected. If the AD Site Code is not one of the configured "Allowed AD Sites," the compliance validator utility will display a message and optionally perform the enforcement measure of logging the user off or shutting down the machine. There are seven different settings for this enforcement measure, as follows:

0=Logoff
1=Shutdown
2=Reboot
4=Forced Logoff
5=Forced Shutdown
6=Power Off
12=Forced Power Off If the above compliance violation takes place, a log is generated in the Windows EventLog and also sent to a configured central logging location. If a non-restricted machine is logged onto by a restricted user, compliance validator will be installed. As an option, when the non-restricted user logs onto the machine, compliance validator can be configured to automatically uninstall itself. Also, the registry settings under [RegistryDeletes] will be removed regardless of the value in PerformRegDels.

The following components are required on the local machine for the correct operation of compliance validator:

Validator.exe—the main executable;

Validator.dtd—the configuration file must exist in the same folder as the executable file.

Compliance Validator Configuration File

The compliance validator configuration file is arranged in the same format as an initialization (ini) file. Each section is named using a string enclosed within square brackets "[ ]." Each value is given a string name followed by an equal sign ("="), then a string value assigned to the name. The exceptions to this are the enumeration sections. These sections are enumerated according to the number of values required to be checked. The enumerated section for "Home Page Conversions" is delimited with a semi-colon to separate the restricted web page and the replacement allowed web page should the restricted web page be found as the user's home page. This configuration allows for multiple web pages to be checked. The configuration file can be commented using asterisks or semi-colons.

Compliance Validator Configuration Sections

[Update]—This section defines the location of the centrally located gold files for both the executable and configuration files. The values of this section are encrypted to prevent tampering. In the event of tampering, the compliance validator utility will display a message and optionally perform enforcement measures.

[Validator Settings]—This section defines main behavior and appearance of the compliance validator utility executable file (Validator.exe).

CentralLog—Defines the location of the log file sent when a compliance violation is encountered.

Banner—The title which shows at the top of the compliance violation message form.

NonComplianceMessage—The message shown in the compliance violation message form.

IEStartupRegKey—The registry key which holds the value determining the user's home page. It is assumed that this key will always be under HKEY_Current_User.

IEStartupRegVal—The value to access under IEStartupRegKey.

dnsDomain—The domain DNS suffix for the domain for which the Active Directory configurations are being enforced.

ShutdownOnError—Boolean value which determines whether enforcement measures are carried out, if armed, when certain errors are encountered which could be construed as tampering.

PerformRegAdds—Boolean value which determines whether the registry settings under [RegistryAdds] are added when a user is determined to be a member of the restricted group.

PerformRegDels—Boolean value which determines whether the registry settings under [RegistryDels] are deleted when a user is determined to be a member of the restricted group. Note that this should normally be false. The [RegistryDeletes] section is used to clean up registry settings under certain conditions regardless of this setting. This setting only affects registry keys and/or values that are removed every time the compliance validator utility is run.

RemoveIfMachineNotInGroup—Boolean value which determines whether compliance validator and all of its settings and files are removed if a non-restricted machine is logged on to by a non-restricted user. At this time, registry settings in [RegistryDeletes] are removed regardless of the value in PerformRegDels.

Armed—Boolean value which determines whether enforcement measures are carried out. The types of enforcement measures are set under [Shutdown Settings].

[RegistryAdds]—Registry keys which can be added at launch time. This can be used to automatically configure a service to run compliance validator on a regular basis. The format for the key settings is as follows:

Key Add: reg=HKLM\Software\ Company\Test

Value Add (String): reg=HKLM\Software\ Company\test=test

Value Add (Expandsz): reg=HKLM\Software\ Company\test=%test%

Value Add (Literal %): reg=HKLM\Software\ Company \test=@%test

Value Add (DWord): reg=HKLM\Software\ Company \test=20d

Value Add (the date): reg=HKLM\Software\ Company \test=@date@

Value Add (PC Name): reg=HKLM\Software\ Company\test=@COMPUTERNAME@

Several keys can be placed under this section. All will be installed at runtime. The registry hives that are used with the RegistryAdds section include HKLM, HKCU, HKCR, HKCC, and HKU as described above.

[RegistryDeletes]—Registry keys which can be deleted at launch time. The format is as follows:

Key Delete: reg=HKLM\Software\ Company\Test

Value Delete: reg=HKLM\Software\ Company\test=*"

Several keys can be placed under this section. All will be installed at runtime. The registry hives that are used with the RegistryDeletes section include HKLM, HKCU, HKCR, HKCC, and HKU as described above.

[Shutdown Settings]—This section determines how enforcement measures are established.

WaitMilliSecs—The time in milliseconds that the compliance message will be displayed before enforcement measures are carried out.

ShutDownParam—A numeric value which determines the type of enforcement measure which is carried out in the event of a compliance violation. The following settings are allowed:

0=Logoff
1=Shutdown
2=Reboot
4=Forced Logoff
5=Forced Shutdown
6=Power Off
12=Forced Power Off The "Armed" setting under "[Validator Settings]" must be set to true for the above measures to take place.

[User Restricted Groups]—An enumerated section which lists all of the Active Directory group names which will be checked to see if the user is a member. If the user is a member of any of these groups, the compliance check will take place.

[Machine Restricted Groups]—An enumerated section which lists all of the Active Directory group names which will be checked to see if the computer is a member. If the computer is a member of any of these groups, the compliance check will take place.

[Permitted AD Sites]—An enumerated section which lists all of the Active Directory Site Codes for the subnets which the user and machine are allowed to access to remain in compliance.

[Home Page Conversions]—An enumerated section which lists a semi-colon delimited list of restricted and allowed web pages which the user might have set as a home page. If the restricted web page is found as the user's home page, it will be changed to the allowed web page, only if the user is a member of a configured restricted AD group.

Exemplary Compliance Validator Configuration File

The following is an exemplary configuration file for the compliance validator utility, with each separate section name enclosed within square brackets:

[Update]
N8uqTFc9TV8UevvqdFwqa/LKysTdIbsYJGotLV4+
    Qw9J6RcXvn/6pxrmA1/kuiHp5Xsj
PdglxVgr5qQHIOFvuMebIAyxjEH4a/x6tTwZm9A=
F3VCdYRnDL6ji1ZPKONKaaNgSYgjA/1To/gRuoL+
    HKY6YtQgrJfZYkvG/1waoYwA
2piTQPL+QC4HjScX1YufcVoBuWnj+
    BARPyOqk104yzE=
[Validator Settings]
CentralLog="\\logs.enterpriseco.com\logs$\Validator"
Banner="Compliance Check"
NonComplianceMessage="This is a test of the Company's compliance validation system. For the period of time of this message you are being warned that you are not in compliance as regards the parameters of this program. Please log out and try to connect in an area that is in your compliance area. Your machine will now shut down."
IEStartupRegKey="Software\Microsoft\Internet
    Explorer\Main"
IEStartupRegVal="Start Page"
dnsDomain="Company.com"
PerformRegAdds=true
PerformRegDels=false
RemoveIfMachineNotInGroup=true
ShutdownOnError=false
Armed=false
[RegistryAdds]
reg=HKLM\SOFTWARE\Company\WinMaint\
    ComplianceValidation\Exec=C:       \Program
    Files\Company\Validator\Validator.exe
reg=HKLM\SOFTWARE\Company\WinMaint\
    ComplianceValidation\SleepMethod=0d
reg=HKLM\SOFTWARE\Company\WinMaint\
    ComplianceValidation\Iterative=0d
reg=HKLM\SOFTWARE\Company\WinMaint\
    ComplianceValidation\Param=false
[RegistryDeletes]
[Shutdown Settings]
MsgSDSecs="10"
WaitMilliSecs=1000
ShutDownParam=12
    ShutsDown machine parameter.
    0=Logoff
    1=Shutdown
    2=Reboot
    4=Forced Logoff
    5=Forced Shutdown
    6=Power Off
    12=Forced Power Off
[User Restricted Groups]
ada-xyzd-restricted-users
ACL-XYZ-IRPtrsTm-RW
[Machine Restricted Groups]
ada-xyzd-restricted-workstations
;APP-PKI-EFSComputers
[Permitted AD Sites]
PXA
PXD
[Home Page Conversions]
http://today.company.com/;http://companydiv.company.
    com/

In the preceding example, XYZ, xyzd, PXA, and PXD are arbitrary designations representing a generic corporation (XYZ), generic corporate division (xyzd), and generic Active Directory sites (PXA, PXD).

Figure 1B:
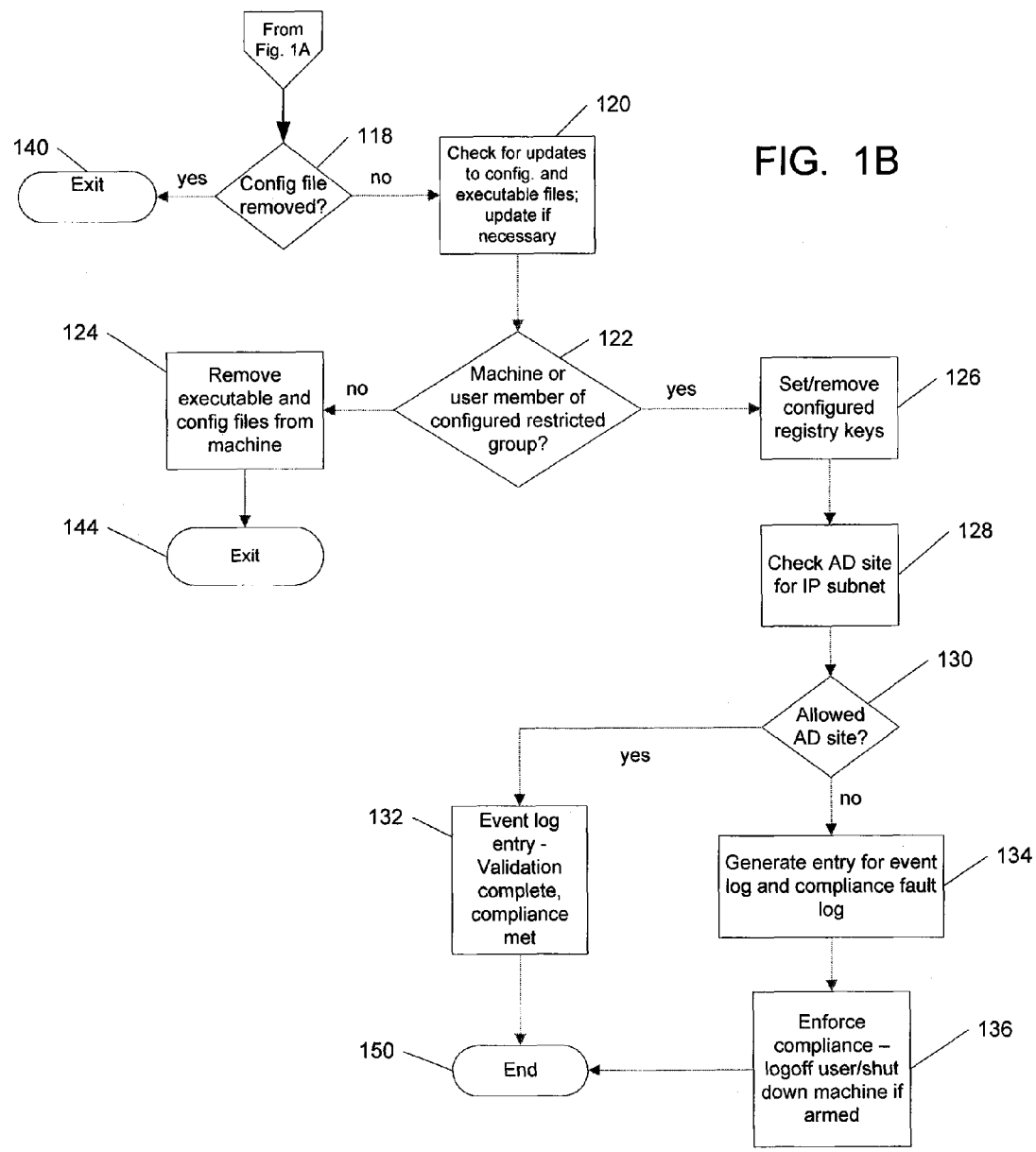

FIGS. 1A-1B illustrate the processing logic for the compliance validator utility. Processing begins as indicated in logic block 100 with the validator event log creation. In decision block 102, a test is made to determine if the computer is on the network. If it is, the executable and configuration files for the compliance validator utility are hashed as indicated in logic block 106. If the computer is not found on the network in decision block 102, the compliance validator utility exits.

From logic block 106, the path to the central update location is decrypted, as shown in logic block 108. In decision block 110, a test is performed to determine if the central update path exists. If it does not, the compliance validator utility exits as shown in block 112. If the central update path exists, a determination is made in decision block 114 as to whether or not the executable update file has been removed. If the executable update file has been removed, the executable and configuration files for the compliance validator utility are removed from the computer, as indicated in logic block 116. The process then exits in block 142.

If the executable update file has not been removed (decision block 114), a test is then made to determine if the configuration file has been removed as indicated in decision block 118. If the configuration file has been removed, the process exits in block 140. If the configuration file has not been removed, the process checks for updates to both the compliance validator configuration and executable files, and updates them if necessary, as indicated in logic block 120. Next, in decision block 122, the process determines if either the computer or user is a member of a restricted group. If neither the machine nor user is a member of a restricted group, the compliance validator configuration and executable files are removed from the computer, as indicated in logic block 124. The process then exits in block 144.

In decision block 122, if either the computer or user is a member of a restricted group (or both), the process sets or removes configured registry keys as shown in logic block 126. Next, the Active Directory site is checked for the IP subnet, as indicated in logic block 128. A determination is made if the Active Directory site is an allowed site as indicated in decision block 130. If the Active Directory site is allowed, an event log entry is made indicating validation is complete, compliance has been met, and the user name. This step is indicated in logic block 132. The compliance validator process then terminates in block 150.

If it is determined in decision block 130 that the Active Directory site is not an allowed site, an entry is generated for both the event log and the compliance fault log, as indicated in logic block 134. The compliance validator then enforces compliance by logging off the user and shutting down the computer, if the process is armed to do so, as indicated in logic block 136. The compliance validator process then terminates in block 150.

The compliance validator tool is designed to automatically configure itself to run with a workstation maintenance utility, referred to herein as WinMaint (acronym for Windows Maintenance Service), that configures workstations to run specific processes at specified times. A preferred embodiment of the workstation maintenance utility is described in a co-pending, commonly assigned patent application entitled "Workstation Uptime, Maintenance, and Reboot Service," filed on Apr. 11, 2006 as application Ser. No. 11/402,094. This application is incorporated by reference in its entirety herein. Ideally, the compliance validator utility would be set to run once an hour to validate standard subnet compliance. But other settings are possible as discussed herein. The best way to setup the workstation maintenance utility (WinMaint) with the compliance validator utility is to place the required registry keys in the [RegistryAdd] section of the compliance validator configuration file as in the following example:

[RegistryAdds]
HKLM\SOFTWARE\Company\WinMaint\Compliance Validation\Exec=C:\Program Files\Company\Validator\Validator.exe
HKLM\SOFTWARE\Company\WinMaint\Compliance Validation\SleepMethod=0d
HKLM\SOFTWARE\Company\WinMaint\Compliance Validation\Iterative=0d
HKLM\SOFTWARE \Company\WinMaint\Compliance Validation\Param=false Under these circumstances, it would also be appropriate to add keys to be removed upon cleanup to the [RegistryDeletes] section. For example:

[RegistryDeletes]
HKLM\SOFTWARE \ Company\WinMaint\Compliance Validation

Workstation Maintenance Utility

The workstation maintenance utility is a service that enables configuration of a large number of workstations to run specific processes at a scheduled time without every workstation running specific processes at the same time. The workstation maintenance utility can be managed remotely. The time that a workstation is set to run is relative to the startup time of the service or workstation. Since every workstation will have a different startup time, the time the processes are scheduled to run will be at random intervals preventing the potential problem of network overload.

The workstation maintenance utility is installed using a standard installation program such as Microsoft Windows Installer for workstations operating on the Microsoft Windows platform. The command line for workstation maintenance utility can also install and uninstall the service. Once installed as a service, the workstation maintenance utility will check every hour to see if it has anything assigned for it to do. If the workstation maintenance utility has nothing that is ready to be run, it simply goes back to sleep for another hour.

The workstation maintenance utility is command line executable. In an exemplary embodiment in a Windows platform environment, typing WinMaint -? at the command line will display the following message:

SYNTAX:
WinMaint [-i] [-u] [-?]
-i—Install WinMaint as a service.
-u—Uninstall WinMaint as a service.
-?—This help screen.

The workstation maintenance utility component of the invention can be configured to operate in several ways. In an exemplary embodiment, when the service or workstation is started, the workstation maintenance utility sleeps for one hour before it wakes up and checks if it has any tasks to perform.

There are several possible methods that the workstation maintenance utility can use to determine if a process is ready to be launched. These methods include, but are not limited to, the following:

1. launch the service after the first hour since boot up, and every hour thereafter at the same minute;
2. launch the service after a specified amount of wait time, specified in milliseconds;
3. launch the service on every occasion of a specified day of the week and at a local time zone hour;
4. launch only on a specified date and at a local time zone hour;
5. launch every day during a specified local time zone hour.

The workstation maintenance utility deals in increments of hours in an exemplary embodiment. The minute of launch is determined by the time (i.e., minute) that the workstation or service started up, thereby providing random launch capabilities. When the workstation boots up and the workstation maintenance utility is started, it will sleep for one hour before it checks to see if there is any code to launch. Afterwards, it will check once every hour to see if the conditions are right to launch the given code.

Figure 2:
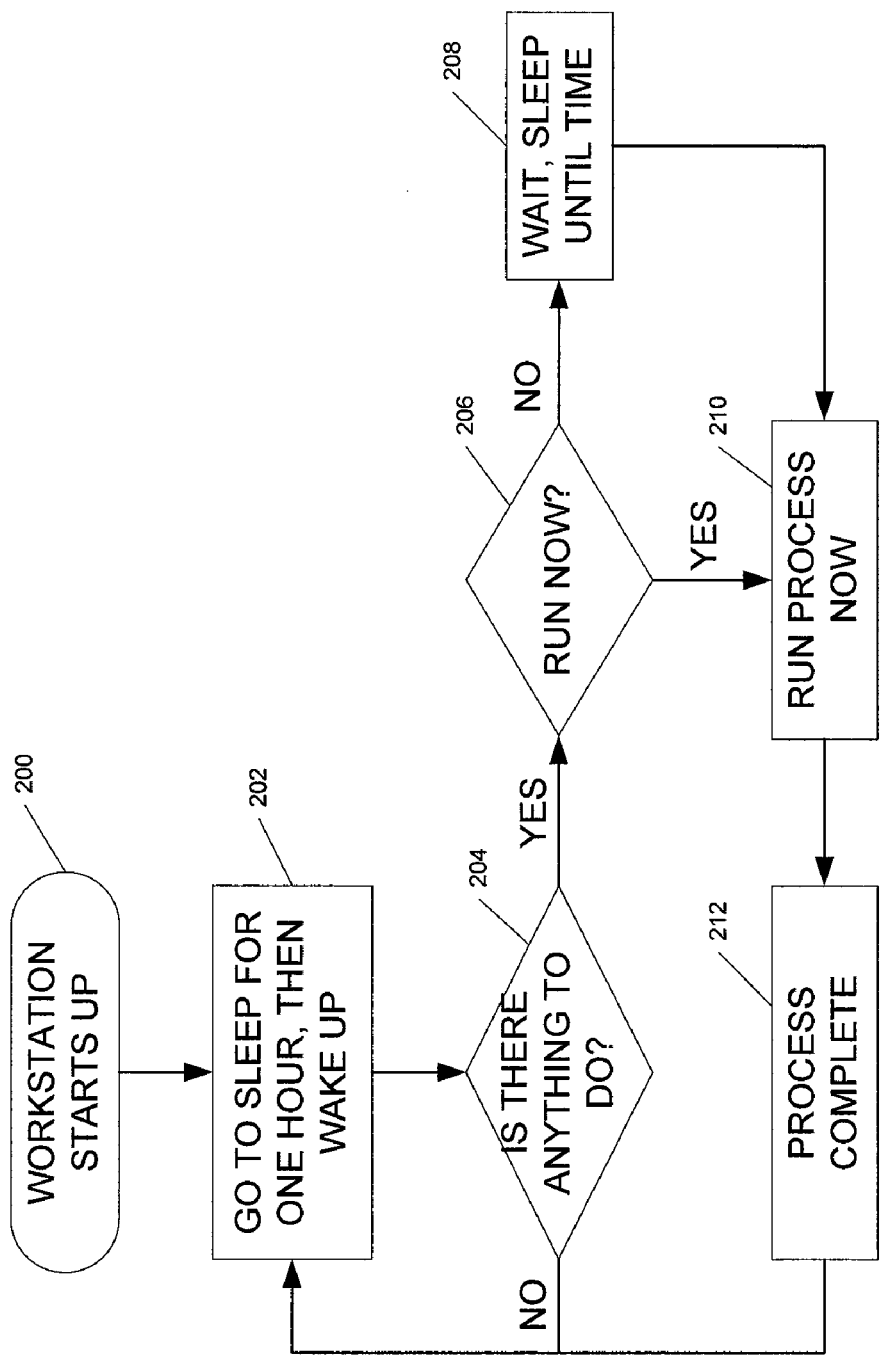
FIG. 2 illustrates the high level processing logic for the workstation maintenance utility component that operates in conjunction with the compliance validator utility in accordance with an exemplary embodiment of the invention.

FIG. 2 illustrates the high level processing logic for the workstation maintenance utility component in the exemplary embodiment. Processing begins as indicated in logic block 200 with the workstation start up. The workstation maintenance utility process goes to "sleep" for one hour and then wakes up as indicated in logic block 202. In decision block 204, the workstation maintenance utility determines if there is anything to do. If there is no process to run, the workstation maintenance utility returns to logic block 202 and goes back to sleep for another hour. If it determines there is a process to run, a determination is made as to whether or not to run the process immediately as indicated in logic block 206. The workstation maintenance utility can go back to sleep for an additional period of time (logic block 208) or run the process immediately (logic block 210). When the process completes as indicated in logic block 212, the workstation maintenance utility returns to logic block 202 to wait for the next cycle to begin. It should be noted that once the workstation starts up, the workstation maintenance utility runs continuously.

To launch a particular maintenance procedure the following steps are required: (1) place the executable code in a directory accessible by the workstation; (2) under the registry key, "HKLM\SOFTWARE\Company\WinMaint\", create a sub-key with a unique name for the code to be launched; and (3) under the new sub-key, create the set of values from the table below which will cause the code to launch at the specified time.

TABLE 1

SleepMethod:

0 = Launch after the first hour of bootup and every hour afterwards at the same minute.
1 = Launch after every specified amount of wait time, specified in milliseconds.
2 = Launch on every occasion of a specified day of the week and local time zone hour.
3 = Launch only on a specified date and local time zone hour.
4 = Launch every day during a specified local time zone hour.
Exec: String Value with the name of the executable code including the path, e.g., C:\Company\WinMaint \UpTime.exe.
Param: String Value can either be blank or contain the parameters to pass to the executable code.
Iterative:

0 = Code will not run if it is still in memory.
1 = Code will run again even if it is still in memory.

If the Sleep Method value is zero, no other values are required. If the Sleep Method value is one, the user must specify the amount of time in milliseconds to wait before launching the code. The specified time does not begin until one hour after bootup or service start.

When the Sleep Method value is one, the workstation maintenance utility will launch a thread after the first hour which will then go to sleep for the specified amount of time. After the specified amount of time has passed, the thread will then launch the code specified by "Path" and "Exec." When the thread is launched, a flag value in the created application key is set to one to keep the thread from being launched again. After the code is launched, the flag is set to zero. If the computer is rebooted before the specified sleep time has ended, the flag value is automatically reset to zero and the thread will be launched again after an hour has passed.

If the Sleep Method value is two, the user must enter a numeric value representing the day of the week, and a numeric value representing the hour of the day that the code should be launched. The code will be launched every time this day is reached at the hour specified. The code will not launch if an hour is not specified. The range of values for day of the week are zero (Sunday) though six (Saturday). The hour of the day is a numeric value representing the hour to launch the code. The range of values is 0-23. The hour refers to the local time zone.

If the Sleep Method value is three, then the user must enter a month, day, year and hour of the day for the code to be launched. The month is expressed as a numeric value representing the month in which the code should be launched. The range of values is 1-12. The day is a numeric value representing a date that exists within that month. The range of day values is 1-31, but if 31 does not exist in the given month, the code will not be launched. The year is a numeric value representing the year that the code should be launched. The year value will be a four digit number such as 2001. The hour is a numeric value representing the hour to launch the code. The range of values is 0-23. The hour refers to the local time zone.

If the Sleep Method value is four, the user must enter a numeric value representing the hour to launch the code. The range of values is 0-23. The hour refers to the local time zone.

When Sleep Method 2, 3 or 4 is used, the workstation maintenance utility will begin checking after the first hour and continue checking every hour for the correct time specified. The code will usually not launch exactly at the specified hour, but instead within an hour after the specified time has passed. This is based upon what time the workstation was brought up and the service was started. In other words, if the computer is brought up at 8:04 AM and the Sleep Method is 2 for Sunday at 10:00 PM (or 22 as specified in the 'Hour' value), the code will more than likely launch on Sunday at 10:04 PM.

If the registry value for "Debug" is set to one under "HKLM\SOFTWARE\Company\WinMaint\", this setting will cause the workstation maintenance utility service to detail an activity log file under c:\energyco\logs called WinMaint.log. It is best to use the debug feature only for a short period during troubleshooting since the log file will otherwise continue to grow. It is also a good idea to delete the file when troubleshooting has been completed so that the next time it is needed it starts fresh. To change the debug value, it is necessary to stop and start the service. After setting the debug value for troubleshooting purposes, the debug feature may be turned off by setting the value to zero and stopping and starting the service. All other registry settings can be made without stopping and starting the service. The service will simply re-check the settings each hour.

Figure 3:
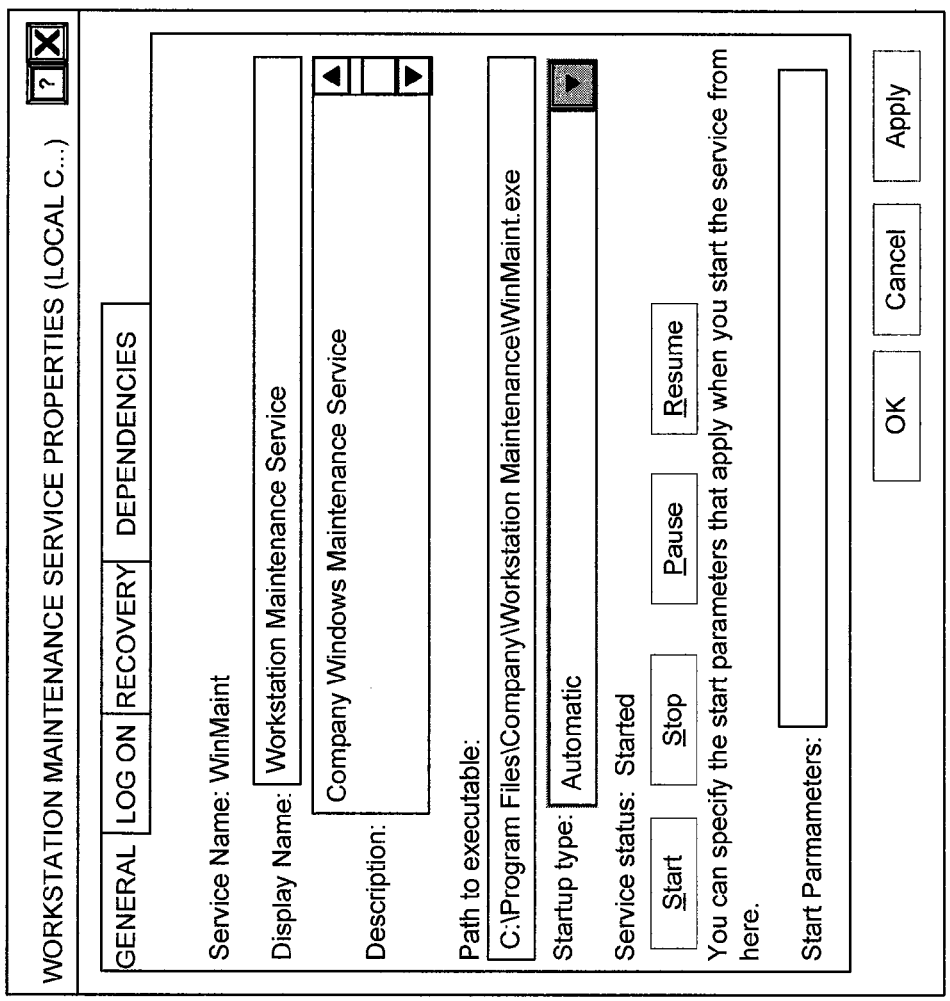
FIG. 3 illustrates an exemplary workstation maintenance utility service properties display.
Figure 4:
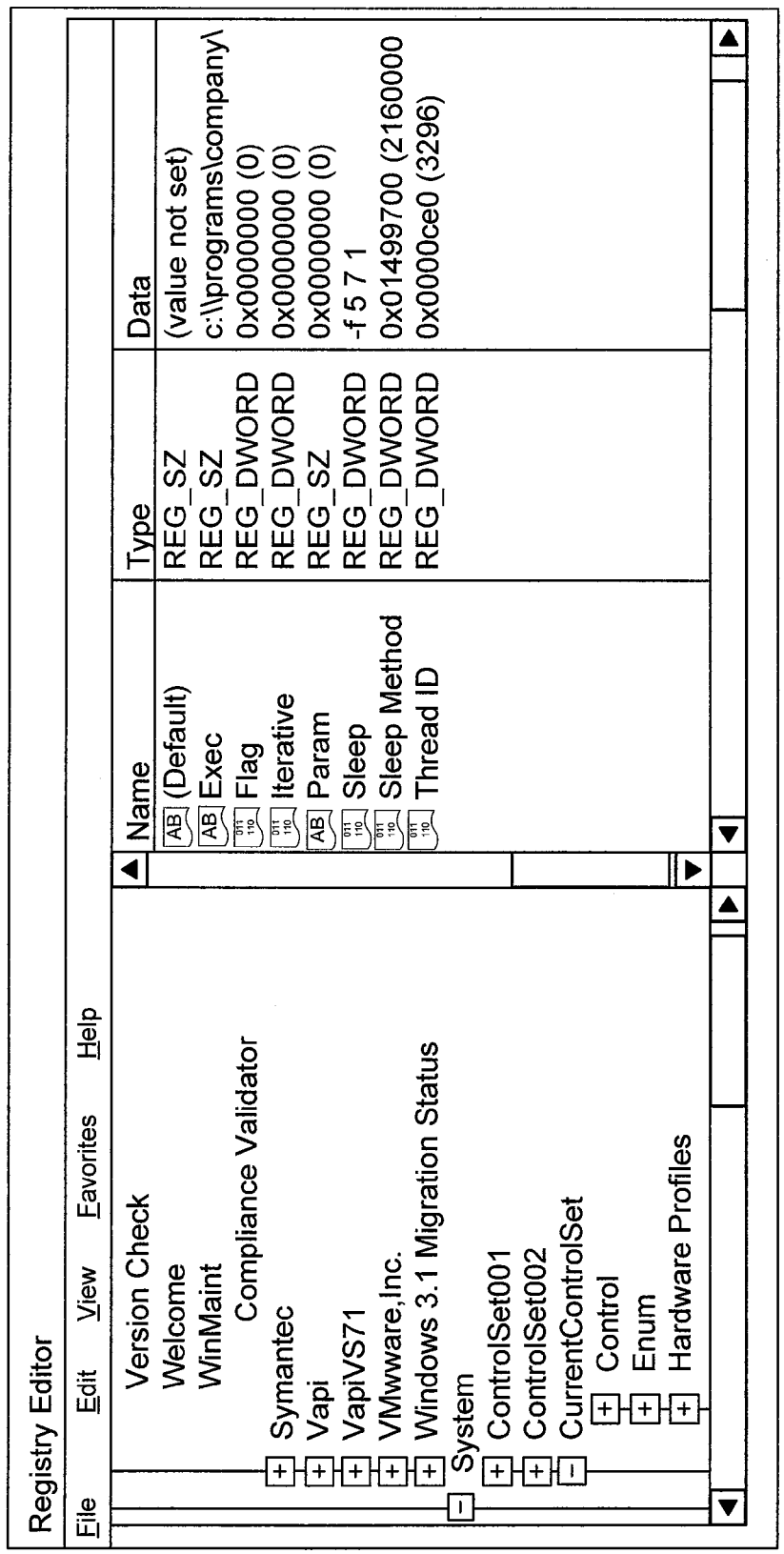
FIG. 4 illustrates an exemplary workstation platform registry editor.

FIG. 3 illustrates an exemplary workstation maintenance utility service properties editor display. This figure shows the service name, description, path to executable, startup type, and service status. FIG. 4 illustrates an exemplary workstation platform registry editor. The workstation maintenance utility is configured using the registry editor. This figure shows one application ("Compliance Validator") configured to be run by the workstation maintenance utility. Other applications would simply follow the "Compliance Validator" under the "WinMaint" key.

The compliance validator tool is also designed to run with a digital hashing function that can create all the hash files required for proper operation of the tool. The digital hashing function hashes executable and configuration files for the compliance validator tool. The digital hashing function must be able to encrypt text and create a hash file of the encrypted file. The digital hashing function can only open an existing file already encrypted by the digital hashing function, or by another hashing function with the exact same encryption algorithm. However, the invention is not limited to any particular digital hash function. Digital hash functions are well-known in the art and there are many hash functions that would be suitable for use with the compliance validator tool.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the scope of the present invention.

In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed is:

1. A method for detecting and enforcing compliance with access requirements for a computer system in a restricted computer network, comprising the steps of:

creating a compliance validation configuration file for the computer system;

configuring a maintenance service utility to launch a compliance validation executable file at a specified time during operation of the computer system;

generating a digital hash for the compliance validation executable file and the compliance validation configuration file;

determining if the computer system or a computer system user is a member of a configured restricted group;

if the computer system or the computer system user is a member of a configured restricted group, determining if a directory site code for a subnet of the restricted computer network to which the computer system is connected corresponds to a configured and allowed site; and enforcing compliance with access requirements if the directory site code does not correspond to a configured and allowed site;

determining if there are any updates at a central update location for either the compliance validation executable or configuration files that require installation, based on the digital hash of the compliance validation executable and configuration files;

automatically updating the compliance validation executable file and compliance validation configuration file, if any updates are available;

determining if a compliance validation executable update file has been removed from the central update location;

if the update file has been removed, removing the compliance validation executable file and the compliance validation configuration file from the computer system; and encrypting a path to the central update location to prevent tampering with at least one of the compliance validation executable update file and the compliance validation configuration file stored at the central update location.

2. The method for detecting and enforcing compliance with access requirements of claim 1 wherein the step of enforcing compliance comprises at least one of automatically logging the user off the computer system, and automatically shutting down the computer system.

3. The method for detecting and enforcing compliance with access requirements of claim 1 wherein the step of enforcing compliance comprises displaying a message to the user that the computer system is not in compliance with access requirements for the restricted computer network.

4. The method for detecting and enforcing compliance with access requirements of claim 1 further comprising automatically removing the compliance validation executable file and the compliance validation configuration file from the computer system, if either the computer system or the computer system user is not a member of a configured restricted group.

5. The method for detecting and enforcing compliance with access requirements of claim 1 wherein the step of configuring the maintenance service utility to launch a compliance validation executable file comprises selecting an activation time for the maintenance service utility.

6. A system for detecting and enforcing compliance with access requirements for a computer in a restricted computer network, comprising:
- a local data store;
- a processor for executing a plurality of components including:
  - a component for creating a compliance validation configuration file and storing the configuration file in the local data store;
  - a component for configuring a maintenance service utility to launch a compliance validation executable file stored in the local data store at a specified time during operation of the computer;
  - a component for generating a digital hash for the compliance validation executable file and the compliance validation configuration file;
  - a component for determining if the computer or a computer user is a member of a configured restricted group;
  - a component for determining if a directory site code for a subnet of the restricted computer network to which the computer is connected corresponds to a configured and allowed site, if the computer or the computer user is a member of a configured restricted group; and
  - a component for enforcing compliance with access requirements if the directory site code does not correspond to a configured and allowed site;
  - a component for determining if there are any updates at a central update location for either the compliance validation executable or configuration files that require installation, based on the digital hash of the compliance validation executable and configuration files;
  - a component for automatically updating the compliance validation executable file and compliance validation configuration file, if any updates are available;
  - a component for determining if a compliance validation executable update file has been removed from the central update location, and if the update file has been removed, removing the compliance validation executable file and the compliance validation configuration file from the computer;
  - a component for encrypting a path to the central update location to prevent tampering with at least one of the compliance validation executable update file and the compliance validation configuration file stored at the central update location; and
  - a component for automatically removing the compliance validation executable file and the compliance validation configuration file from the computer, if either the computer or the computer user is not a member of a configured restricted group.

7. The system for detecting and enforcing compliance with access requirements of claim 6 wherein the component for enforcing compliance automatically logs the user off the computer.

8. The system for detecting and enforcing compliance with access requirements of claim 6 wherein the component for enforcing compliance automatically shuts down the computer.

9. The system for detecting and enforcing compliance with access requirements of claim 6 wherein the component for enforcing compliance displays a message to the user that the computer is not in compliance with access requirements for the restricted computer network.

10. The system for detecting and enforcing compliance with access requirements of claim 6 wherein the component for configuring the maintenance service utility to launch a compliance validation executable file comprises a module for selecting an activation time for the maintenance service utility.

11. A non-transitory computer program product for detecting and enforcing compliance with access requirements for a computer system in a restricted computer network when operated on a processor of the computer system, the program product comprising a computer readable medium having computer readable code embedded therein, the computer readable medium comprising:
- program instructions that create a compliance validation configuration file for the computer system;
- program instructions that configure a maintenance service utility to launch a compliance validation executable file at a specified time during operation of the computer system;
- program instructions that generate a digital hash for the compliance validation executable file and the compliance validation configuration file;
- program instructions that determine if the computer system or a computer system user is a member of a configured restricted group; and
- program instructions that determine if a directory site code for a subnet of the restricted computer network to which the computer system is connected corresponds to a configured and allowed site, if the computer system or the computer system user is a member of a configured restricted group; and program instructions that enforce compliance with access requirements if the directory site code does not correspond to a configured and allowed site;

program instructions that determine if there are any updates at a central update location for either the compliance validation executable or configuration files that require installation, based on the digital hash of the compliance validation executable and configuration files;

program instructions that automatically update the compliance validation executable file and compliance validation configuration file, if any updates are available;

program instructions that determine if a compliance validation executable update file has been removed from the central update location; and program instructions that remove the compliance validation executable file and the compliance validation configuration file from the computer system, if the update file has been removed; and program instructions that encrypt a path to the central update location to prevent tampering with at least one of the compliance validation executable update file and the compliance validation configuration file stored at the central update location.

12. The non-transitory computer program product for detecting and enforcing compliance with access requirements of claim 11 wherein the program instructions that enforce compliance automatically log the user off or automatically shut down the computer system.

13. The non-transitory computer program product for detecting and enforcing compliance with access requirements of claim 11 wherein the program instructions that enforce compliance display a message to the user that the computer system is not in compliance with access requirements for the restricted computer network.

14. The non-transitory computer program product for detecting and enforcing compliance with access requirements of claim 11 further comprising program instructions that automatically remove the compliance validation executable file and the compliance validation configuration file from the computer system, if the computer system or the computer system user is not a member of a configured restricted group.

15. The non-transitory computer program product for detecting and enforcing compliance with access requirements of claim 11 wherein the program instructions that automatically configure the maintenance service utility to launch a compliance validation executable file comprise program instructions for enabling selection of an activation time for the maintenance service utility.

* * * * *